US009939105B1

(12) United States Patent
Hall et al.

(10) Patent No.: US 9,939,105 B1
(45) Date of Patent: Apr. 10, 2018

(54) OVERHEAD MOUNTING SYSTEM

(71) Applicants: David R. Hall, Provo, UT (US); Joe Fox, Spanish Fork, UT (US); Jerome Miles, Spanish Fork, UT (US)

(72) Inventors: David R. Hall, Provo, UT (US); Joe Fox, Spanish Fork, UT (US); Jerome Miles, Spanish Fork, UT (US)

( * ) Notice: Subject to any disclaimer, the term of this patent is extended or adjusted under 35 U.S.C. 154(b) by 0 days.

(21) Appl. No.: 15/487,999

(22) Filed: Apr. 14, 2017

(51) Int. Cl.
*F16M 13/02* (2006.01)
*F16B 1/00* (2006.01)
*F16M 13/04* (2006.01)

(52) U.S. Cl.
CPC ............. *F16M 13/027* (2013.01); *F16B 1/00* (2013.01); *F16M 13/04* (2013.01); *F16B 2001/0035* (2013.01)

(58) Field of Classification Search
CPC ........ F16M 13/027; F16M 13/04; F16B 1/00; F16B 2001/10035
USPC ....................................................... 248/544
See application file for complete search history.

(56) References Cited

U.S. PATENT DOCUMENTS

| | | | | |
|---|---|---|---|---|
| 2,867,681 A * | 1/1959 | Huehnel | ................ | H02G 3/045 138/103 |
| 3,338,599 A * | 8/1967 | Hallman | .............. | H02G 3/0608 138/158 |
| 3,541,224 A * | 11/1970 | Joly | ..................... | H01R 25/162 174/494 |
| 5,063,473 A * | 11/1991 | Hall | ....................... | H01R 27/02 174/68.3 |
| D404,010 S * | 1/1999 | Viklund et al. | .............. | D13/155 |
| 7,651,056 B2 * | 1/2010 | Tjerrild | ................... | F16L 3/133 248/58 |

\* cited by examiner

*Primary Examiner* — Anita M King

(57) ABSTRACT

Embodiments of overhead mounting systems are described herein. Various embodiments may include a channel, one or more covers, and one or more cover spacers. The channel may include a channel base, at least two channel walls, and at least two channel ends. The channel walls may be connected perpendicularly to the channel base such that the channel is u-shaped. The channel walls may each comprise a plurality of channel wall openings. The covers may include a cover base, at least two cover walls, and at least two cover ends. The cover walls may each include one or more inward protrusions. The cover ends may be concaved along the cover base such that a cover base length is less than a cover wall length. The cover ends may be concaved along one or more of the cover walls.

20 Claims, 13 Drawing Sheets

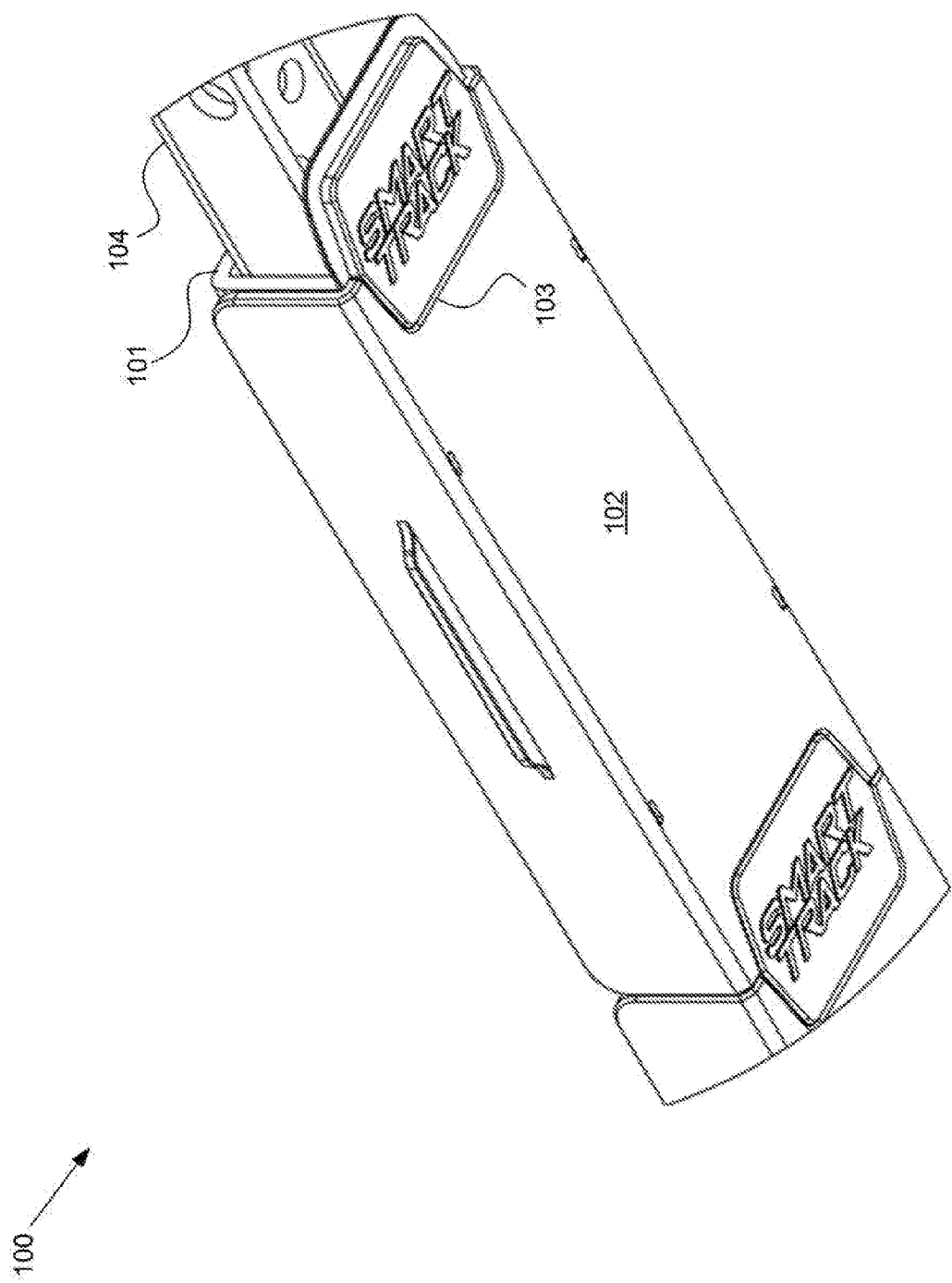

OVERHEAD MOUNTING SYSTEM

TECHNICAL FIELD

This invention relates generally to the field of overhead mounting systems.

BACKGROUND

Garage organization is, for some, the bane of homeownership. The struggle to organize many tools and miscellaneous items of greatly varying shapes and sizes has led to some innovation in garage storage systems. However, most systems are based on the similar concept of creating an overhead floor on which store things. This may be convenient for items that are not frequently used, but is sorely inadequate for items that are frequently accessed, especially for tools. Tools may be stored in more convenient, ground-based boxes or in cabinets, but this may be inconvenient for regularly used tools such as power cords, speakers, compact lifters, and lights, among others. It may be convenient to store such tools in an out-of-the-way location and still have ready access to them. Such a need is amplified by the fact that remote control of such tools is becoming more common. Thus, there is room for improvement in garage organization solutions.

SUMMARY OF THE INVENTION

One solution presented for some of the problems described above is to mount various remotely-controllable devices overhead. Embodiments of overhead mounting systems are described herein that address at least some of the problems described above in the Background. Various embodiments may include a u-shaped channel, one or more u-shaped covers, and one or more cover spacers. The u-shaped channel may include a channel base, at least two channel walls, and at least two channel ends. The channel walls may be connected perpendicularly to the channel base. The channel base may include a plurality of channel base openings. The channel walls may each comprise a plurality of channel wall openings spaced from each other by a channel wall inter-opening length. One or more of the channel wall openings may be spaced from at least one of the channel ends by half the channel wall inter-opening length.

The u-shaped cover may include a cover base, at least two cover walls, and at least two cover ends. The cover walls may be connected perpendicularly to the cover base. The cover walls may each include one or more inward protrusions. At least one of the one or more inward protrusions may be spaced from at least one of the cover ends by half the channel wall opening length. The cover ends may be concaved along the cover base such that a cover base length is less than a cover wall length. The cover ends may be concaved along one or more of the cover walls such that the cover wall length is less than the cover base length. The cover ends may be concaved along the cover base and along one or more of the cover walls.

The cover spacer may include a flange and a spacer base. The spacer base may include a shape complementary to the cover end concavity. The u-shaped channel may have an exterior width less than or equal to a u-shaped cover interior width extending between the cover walls. The u-shaped channel exterior width may be greater than a width across the u-shaped cover between at least two laterally-aligned inward protrusions.

BRIEF DESCRIPTION OF THE DRAWINGS

A more particular description of the apparatus summarized above is made below by reference to specific embodiments. Several embodiments are depicted in drawings included with this application, in which:

FIGS. 1A-E depict various perspectives of an overhead mounting system;

DETAILED DESCRIPTION

Figure 1A:
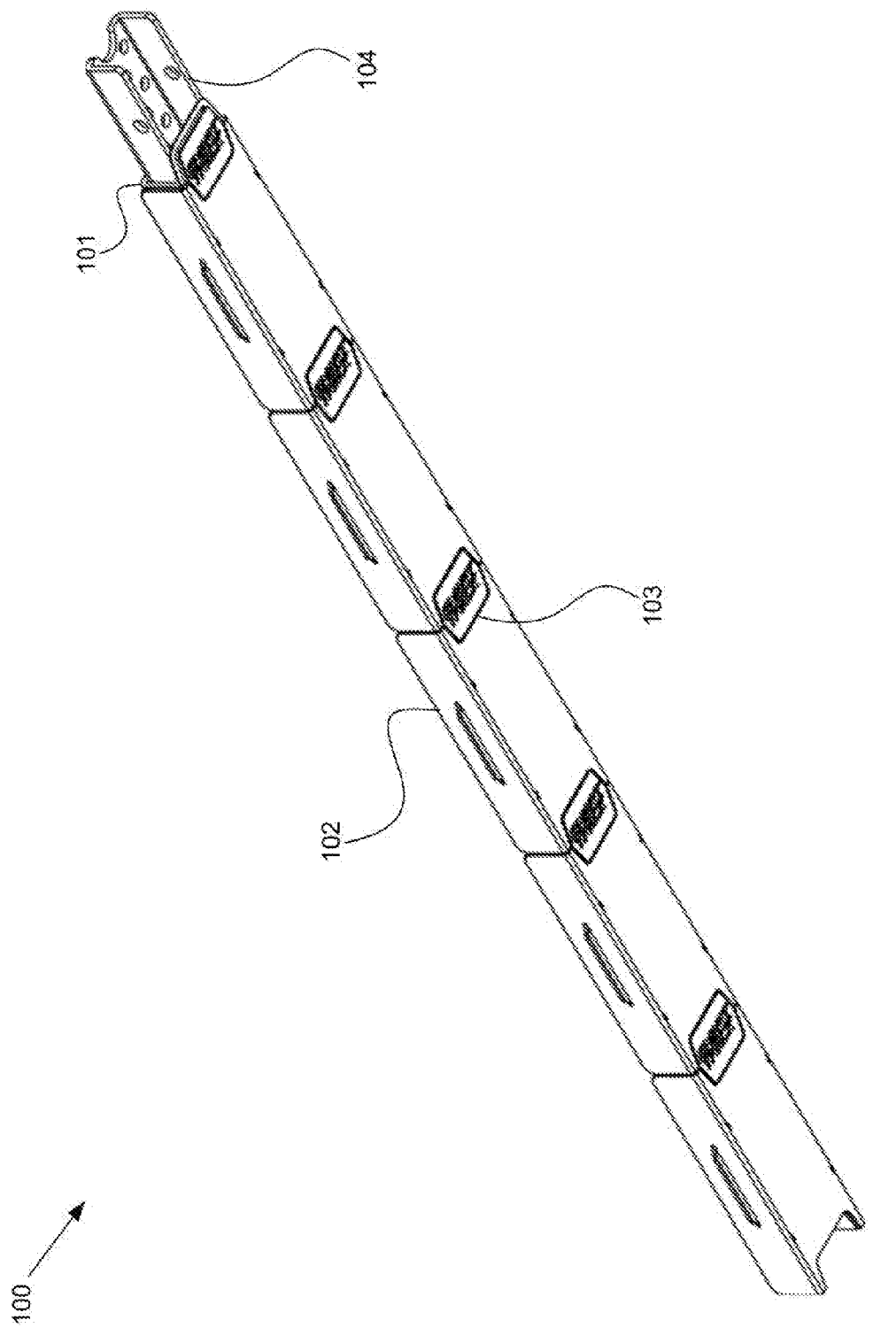

A detailed description of embodiments of an apparatus is provided below by example, with reference to embodiments in the appended figures. Those of skill in the art will recognize that the features of the apparatus as described by example in the figures below could be arranged and designed in a wide variety of different configurations. Thus, the detailed description of the embodiments in the figures is merely representative of embodiments of the invention, and is not intended to limit the scope of the invention as claimed.

Embodiments of overhead mounting systems are described herein. Various embodiments may include a channel, one or more covers, and one or more cover spacers. The channel may include a channel base, at least two channel walls, and at least two channel ends. The channel walls may be connected perpendicularly to the channel base such that the channel is u-shaped. The channel base may include a plurality of channel base openings. The channel walls may each comprise a plurality of channel wall openings spaced from each other by a channel wall inter-opening length. One or more of the channel wall openings may be spaced from at least one of the channel ends by half the channel wall inter-opening length.

The covers may include a cover base, at least two cover walls, and at least two cover ends. The cover walls may be connected perpendicularly to the cover base such that the cover is u-shaped. The cover walls may each include one or more inward protrusions. At least one of the one or more inward protrusions may be spaced from at least one of the cover ends by half the channel wall opening length. The cover ends may be concaved along the cover base such that a cover base length is less than a cover wall length. The cover ends may be concaved along one or more of the cover walls such that the cover wall length is less than the cover base length.

The cover spacers may include a flange and a spacer base. The spacer base may include a shape complementary to the cover end concavity. The u-shaped channel may have an exterior width less than or equal to a u-shaped cover interior width extending between the cover walls. The u-shaped channel exterior width may be greater than a width across the u-shaped cover between at least two laterally-aligned inward protrusions. The channel exterior width may range from half an inch to four inches, one inch to 3½ inches, 1½ inches to three inches, or two inches to 2½ inches. The cover interior width may range from 9/16 an inch to 4 1/16 inch, 1 1/16 inch to 3 9/16 inches, 1 9/16 inches to 3 1/16 inches, or 2 1/16 inches to 2 9/16 inches.

The channel may be used to mount one or more devices to a surface. The surface may include an overhead surface such as a ceiling, a wall, or a floor. The channel may accommodate wiring for the devices. The devices may be daisy-chained by wiring running along the channel. The covers may support and/or hide the wiring. The concavity may allow the wiring to pass from the channel and connect to the devices. The cover spacers may be provided between the covers in the concavities where no wiring passes from the channel and/or where two covers are directly adjacent each other. The channel, the covers, and/or the spacers may be comprised of one or more materials. Such materials may include any of a variety of thermoplastics, including acrylic, ABS, nylon, PLA, polybenzimidazole, polycarbonate, polyether sulfone, polyetherether ketone, polyetherimide, polyethylene, polyphenylene oxide, polyphenylene sulfide, polypropylene, polystyrene, PVC, and/or TEFLON, one or more metals, including aluminum, iron, steel, brass, and/or chrome, and/or one or more composite materials including carbon, carbon fiber, and/or fiberglass. Such materials may include combinations of the previously listed materials. In some embodiments, the channel is comprised of powder-coated steel, and the covers and cover spacers are comprised of injection-molded ABS.

In some embodiments, the channel may be mounted overhead to one or more trusses, such as in a garage. The channel may be mounted directly to the trusses, or may be mounted to the trusses through a ceiling such as a drywall ceiling. The channel may be mounted to the ceiling by two lag bolts screwed into two truss beams. The lag bolts may pass through channel base openings. The channel may be mounted along a length of a single truss, perpendicular to a single truss, or perpendicular across two or more trusses. A significant problem in designing overhead mounting systems is the variability in inter-truss spacing. Depending on the type of construction and the builder, inter-truss spacing ranges, on average, from 16 inches to 24 inches. Thus, to capture at least a minimum of two trusses at the minimum average inter-truss spacing, the channel must have a length of at least 16 inches. Accordingly, the length of the channel may range from 16 inches to 48 inches in various embodiments. Another factor to consider when designing overhead mounting systems is the average number of devices a consumer will use and what inter-device spacing the average consumer will use.

The instant inventors have discovered an optimal channel length that balances the variability in inter-truss spacing and the variability in consumer usage is 30 inches. Accordingly, in various embodiments, the length of the channel is 30 inches. The instant inventors have also discovered an optimal number of spaces provided on each channel for accommodating devices and covers is 5. Accordingly, in various embodiments, a length of the channel is five times a length of the cover. The channel may, for example, accommodate five covers consecutively, or the channel may accommodate four full covers and half each of two additional covers, the two halves accommodated at the channel ends. Such may, for example, be an optimal arrangement in embodiments where two or more channels are aligned directly adjacent each other. In such embodiments, a cover or a device may be mounted across the seam between the two adjacent channels. The instant inventors have found that such an arrangement improves the weight distribution of devices across multiple channels.

The channel base may include a flat bar having a narrow width relative to its length. The length-to-width ratio may range from 6:1 to 48:1. The channel walls may extend from sides of the channel base along the length of the channel base. Each channel wall may form an angle with the channel base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each channel wall forms with the channel base may vary along the length of the channel. In some embodiments, the channel walls may extend from opposite sides of the channel base. The channel walls may similarly include flat bars having narrow widths relative to their lengths. The channel wall length-to-width ratio may range from 6:1 to 48:1. The channel ends may be formed of the end-edges of the channel base and the channel walls and may run along the widths of the channel base and the channel walls.

In some embodiments, the channel base and/or the channel walls may be contoured. The contouring may be along edges of the channel base and/or channel walls, and/or may be along surfaces of the channel base and/or channel walls. The contouring may correspond to contouring in a surface to which the channel may be mounted, or a surface against which the channel may rest. In various embodiments, the contouring in the surface and/or the channel may be non-linear.

The channel base may include one or more openings through which the channel base may be mounted to a surface. For example, one or more lag bolts, screws, and/or drywall fasteners may pass through the channel base openings. The channel base openings may have a larger diameter than the channel wall openings. The channel base openings may have a diameter ranging from half an inch to 1½ inches, from ¾ an inch to 1¼ inches, or may be one inch. The channel wall openings may have a diameter ranging from ⅛ an inch to ½ an inch. The channel base openings may be spaced from each other by a channel base inter-opening length. The channel base inter-opening length may range from half an inch to three inches, from one inch to 2½ inches, or from 1½ inches to two inches. The channel base inter-opening length may be shorter than the channel wall inter-opening length. The configuration of the channel openings may simplify installation by allowing a user to easily distinguish the channel base from the channel walls. Additionally, a closer channel base inter-opening spacing may more readily accommodate a variety of inter-truss spacings. The instant inventors have discovered that a ratio of three channel base openings for every two channel wall openings is optimal to balance the variability in inter-truss spacing and the variability in how consumers will typically use the channel. Accordingly, the channel may include three channel base openings for every two channel wall openings.

The channel wall inter-opening length may correspond to a spacing between the inward protrusions of the covers. The channel wall inter-opening length may similarly correspond to openings, pins, and/or protrusions on one or more device-mounting brackets. The channel wall inter-opening length may range from two inches to seven inches, from 2½ inches to 6½ inches, from three inches to six inches, or from four inches to five inches. Similarly, the spacing between the inward protrusions along the same wall of the cover may range from two inches to seven inches, from 2½ inches to 6½ inches, from three inches to six inches, or from four inches to five inches. In some embodiments, the channel wall inter-opening length and the inward protrusion spacing may be four inches.

The channel cover may mount to the channel such that a cavity is formed between the channel base and the cover base. The cavity may accommodate wiring for devices mounted to the channel, and may shield the wiring from view. For example, the cover may be connected to the channel such that the cover base may be disposed opposite the channel base. The inward protrusions may each be disposed in corresponding channel wall openings. In embodiments where the channel is mounted overhead, the protrusions may rest on interior surfaces of the channel wall openings such that the cover is secured to the channel by the inward protrusions. As described above, in some embodiments, multiple covers may be connected to the channel. For example, the mounting system may include at least a first and a second cover. The covers may be connected to the channel, and may be disposed directly adjacent each other. The ends of the cover walls may directly contact each other. A portion of the ends of the cover bases may directly contact each other. The first and second concavities may be formed in the first and second cover bases, and may be disposed opposite each other. In some embodiments including at least two covers connected to the channel adjacent each other, the spacer may be disposed in the concavities between the adjacent covers. The flange may touch and/or rest on inside surfaces of the cover bases, and the spacer base may be disposed between the cover bases in the concavities.

The cover base may include a flat bar. The cover base length-to-width ratio may range from 1:1 to 48:1. The cover may have a length ratio with the channel ranging from 1:1 to 1:48. The cover walls may extend from sides of the cover base along the length of the cover base. The cover walls may, in some embodiments, include one or more grasping flanges extending from external surfaces of the cover walls. Such may be useful for removing the cover from, and attaching it to, the channel. Each cover wall may form an angle with the cover base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each cover wall forms with the cover base may vary along the length of the cover. The variability may be complementary to an angle variability of the channel base and channel walls. In some embodiments, the cover walls may extend from opposite sides of the cover base. The cover walls may similarly include flat bars. The cover wall length-to-width ratio may range from 1:1 to 48:1. The cover ends may be formed of the end-edges of the cover base and the cover walls and may run along the widths of the cover base and the cover walls.

In some embodiments, the cover base and/or the cover walls may be contoured. The contouring may be along edges of the cover base and/or cover walls, and/or may be along surfaces of the cover base and/or cover walls. The contouring may be complementary to contouring in the channel. The contouring may be non-linear.

The inward protrusions may facilitate mounting of the cover to the channel. Accordingly, the one or more inward protrusions may include a bump having at least one sharp edge and at least one sloped edge, at least two sharp edges and at least two sloped edges, or may be semi-spherical. The sloped edge may be oriented closest to the cover base, or the sloped edges may be oriented perpendicular to the cover ends. The sloped-edge, sharp-edge configurations may allow for ease in placing the cover on, and removing the cover from the channel, and may save in large-scale manufacturing costs by reducing the amount of material required to form the bumps.

Each wall may include one or more inward protrusions, the protrusions of opposing walls aligned with corresponding channel wall openings. The protrusions may be aligned with each other parallel the width of the cover base, and complementary channel wall openings may be aligned parallel with the width of the channel base. In some embodiments, each cover wall may include two or more inward protrusions spaced from each other by the channel wall inter-opening length.

As described above, the concavity may be provided to allow wiring to pass from the channel and connect to one or more devices connected to the track. The concavity may have a variety of shapes, including polygonal, rounded, jagged, or combinations thereof. In various embodiments, a depth of the concavity may range from one-eighth of the channel wall inter-opening length to three quarters of the channel wall inter-opening length. The instant inventors have discovered that a concavity with a depth equal to one quarter of the channel wall inter-opening length provides optimal space for wiring to pass from the channel while still providing optimal coverage of the channel, giving the channel and wiring a controlled, minimalist appearance.

The concavity may be disposed along the cover walls, the cover base, or at least one cover wall and the cover base. In some embodiments, the concavity may be disposed along the cover walls on at least one of the cover ends, and the concavity may be disposed along the cover base on an opposite cover end of the at least one cover end. This configuration may allow for variability in how the wiring connects to different devices.

The cover spacer may rest on the cover bases of two directly-adjacent covers, the cover walls of two directly-adjacent covers, or both. The cover spacer may rest on the cover base and/or cover wall of only one cover. The cover spacer may be disposed in the concavity of a single cover base or in the concavity of two directly-adjacent cover bases. In various embodiments, the spacer may have a shape complementary to the concavity. The spacer may be symmetrical, such as in embodiments where the concavities of directly-adjacent covers have the same shape. The spacer may be asymmetrical, such as in embodiments where the concavities of directly-adjacent covers have different shapes.

In some embodiments, the cover spacer may passively rest in the concavity. In some embodiments, the spacer may actively connect to the cover in the concavity. For example, in some embodiments, the spacer may magnetically attach to at least one of the cover ends. The cover may include a ferromagnetic material at the ends, and the spacer may include one or more magnets, such as in the flange or the spacer base. In some embodiments, a handle may extend from the spacer base on an opposite side of the spacer base from the flange. The handle may simplify installation and removal of the spacer into and from the concavity.

The overhead mounting system may include an end cover corresponding to one or more ends of the channel. The end cover may be u-shaped to correspond to the shape of the channel, or may include any of the variety of angles discussed above regarding the channel and the cover. The end cover may be structured similarly to the cover. The end cover may include an end cover base and at least three end cover walls connected perpendicularly to the cover base. At least two of the end cover walls may be parallel to each other and at least one of the end cover walls may be perpendicular to the at least two parallel end cover walls. The third end cover wall may cover end edges of the channel base and channel walls. The parallel end cover walls may each include one or more inward protrusions. At least one of the one or more inward protrusions may be spaced from the perpendicular end cover wall by half the channel wall inter-opening length, and may correspond to at least one channel wall opening. Each parallel end cover wall may include such an inward protrusion.

Some embodiments of the overhead mounting system may include a bridge that connects the channel to other neighboring channels. The channels may have one or more bridge openings corresponding to the bridge. The bridge may reinforce a seam between two neighboring channels.

Various components of the overhead mounting system, including the channel, the cover, and/or the cover spacer, may be formed by a plastic injection molding process. For example, in some embodiments, the cover is formed by plastic injection molding. The cover may include one or more injection molding openings disposed in the cover base along an edge formed by the cover base and at least one of the cover walls. Each injection molding opening may be aligned with at least one inward protrusion. The injection molding opening may correspond to a negative contour in the mold that forms the inward protrusion.

Specific embodiments of the general system described above are depicted in the appended FIGs. and described below regarding those FIGs.

Figure 1B:
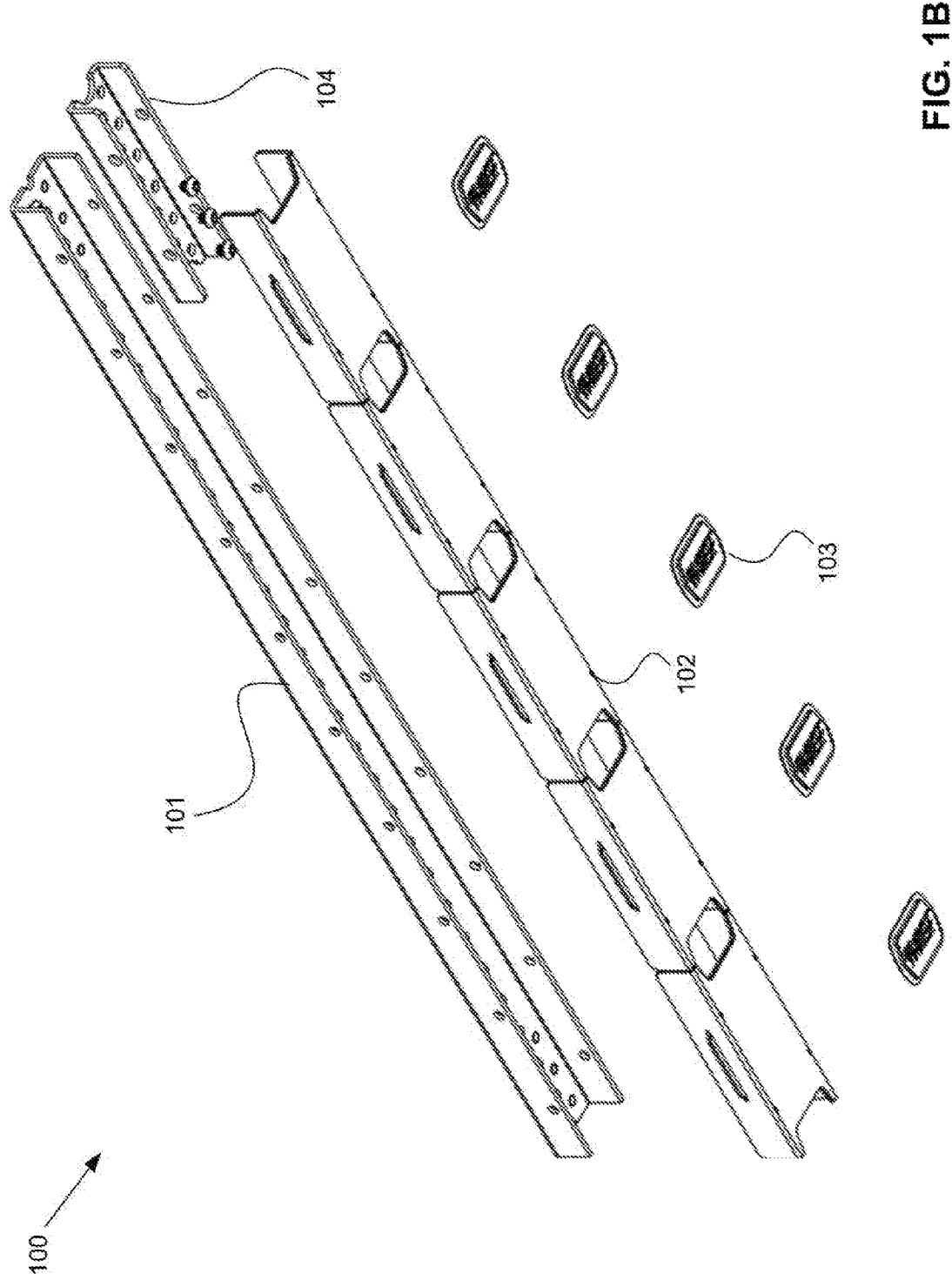
Figure 1C:
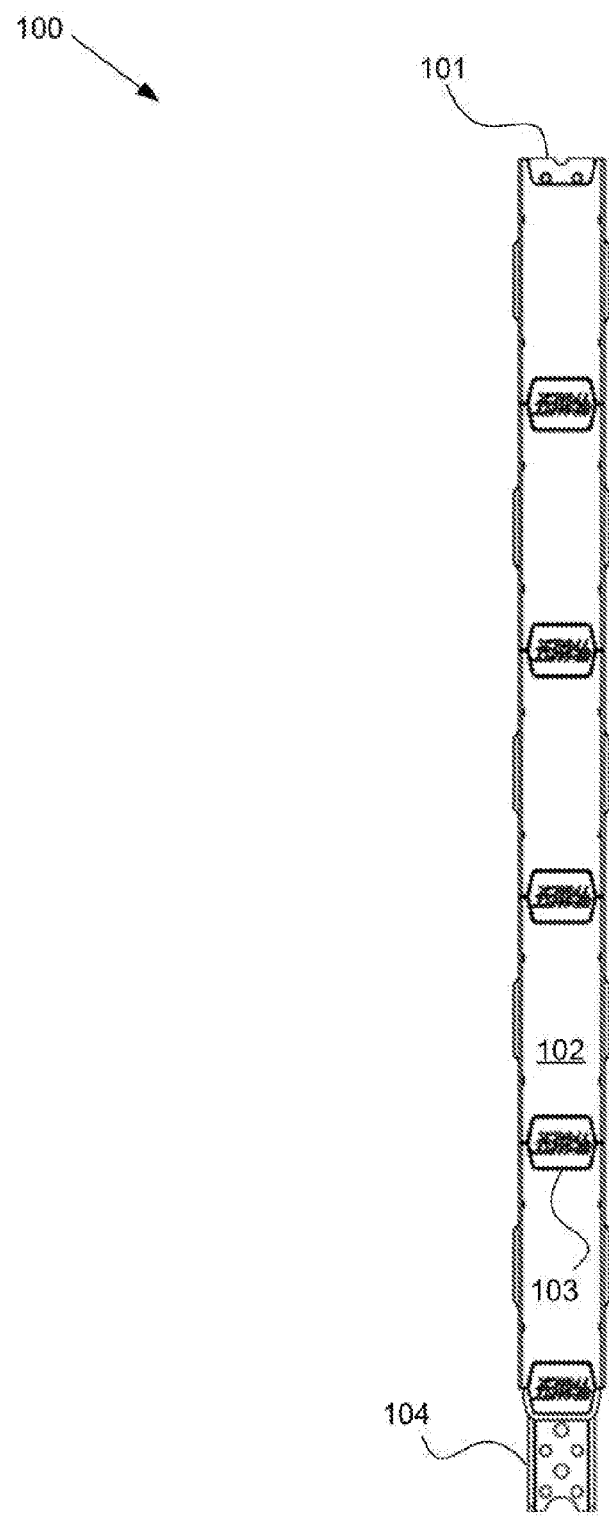
Figure 1E:
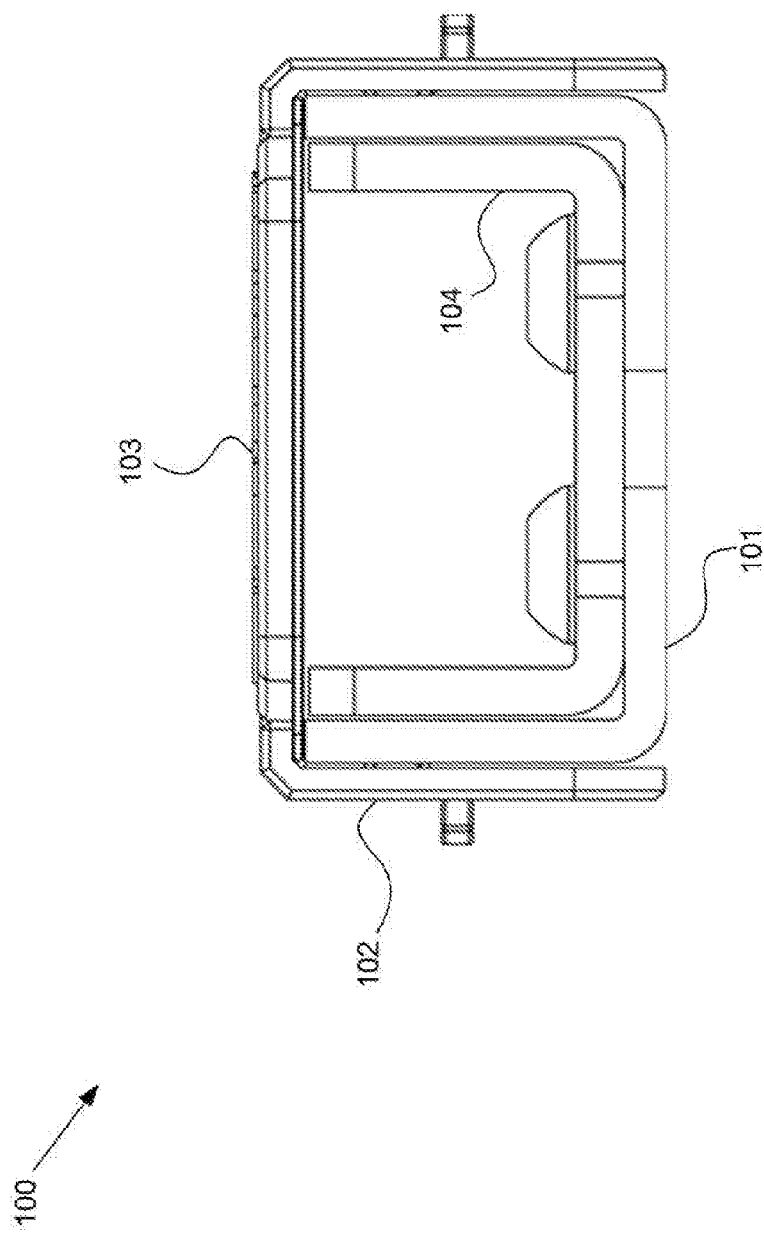

FIGS. 1A-E depict various perspectives of an overhead mounting system. FIG. 1A is an isometric view. FIG. 1B is an exploded isometric view. FIG. 1C is a bottom view. FIG. 1D is a zoomed-in, partial isometric view. FIG. 1E is an end view. The overhead mounting system 100 includes a u-shaped channel 101, a set of five u-shaped covers 102, a set of four cover spacers 103, and a channel bridge 104. The covers mount to the channel, and the spacers are disposed between neighboring covers. The covers are connected to the channel such that each cover touches each neighboring cover.

Figure 2:
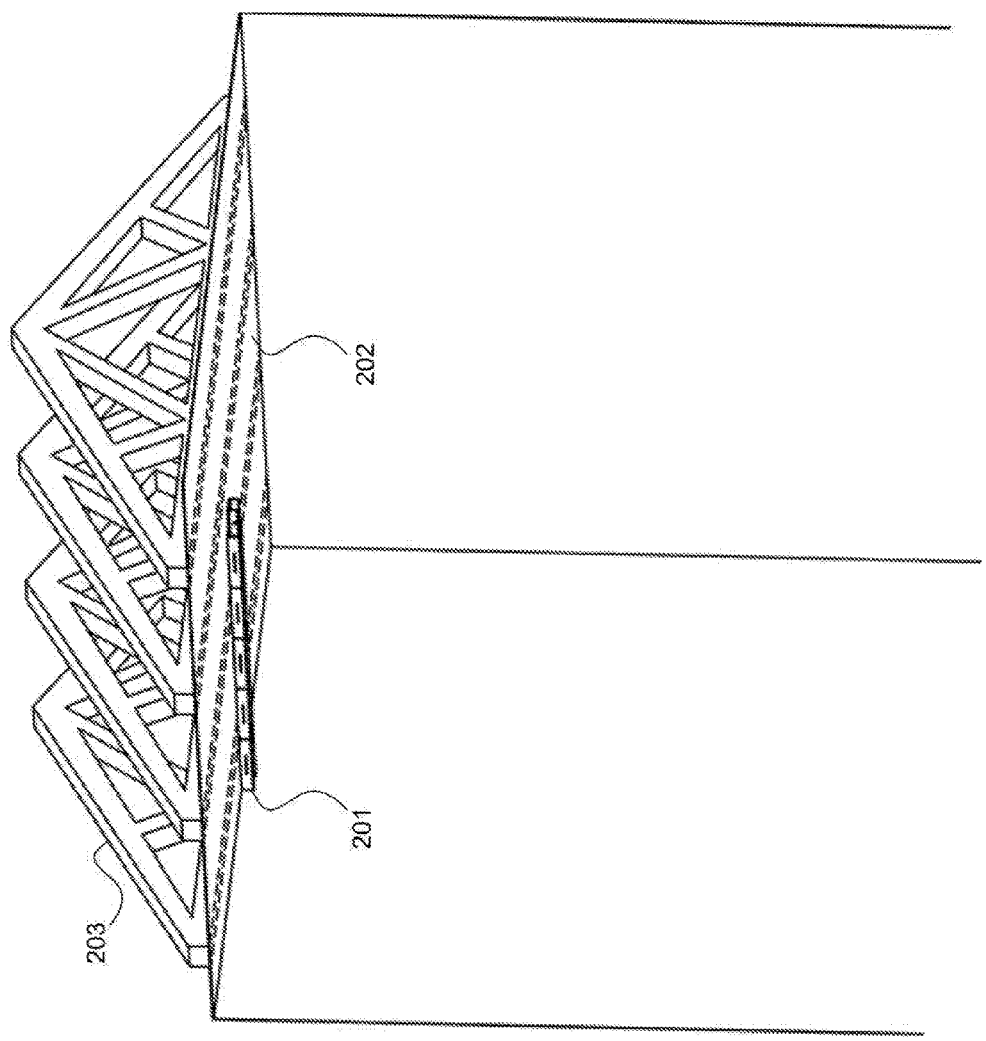
FIG. 2 depicts an isometric view of an overhead mounting system mounted to a ceiling of a garage.

FIG. 2 depicts an isometric view of an overhead mounting system mounted to a ceiling of a garage. The overhead mounting system 201 is mounted to the ceiling 202 by lag bolts screwed into trusses 203. The overhead mounting system spans across two trusses.

Figure 3:
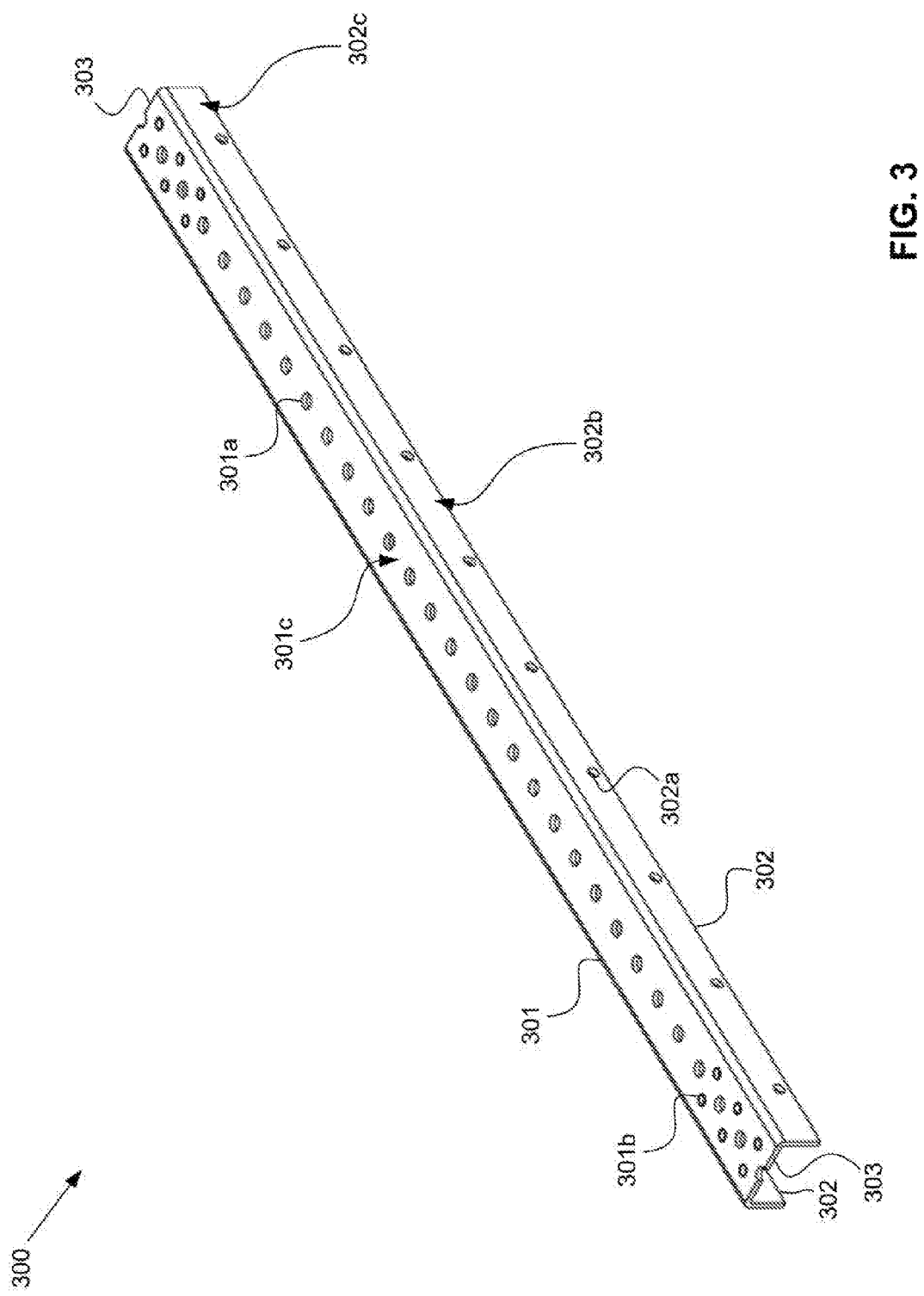
FIG. 3 depicts a bottom-isometric view of a u-shaped channel for use in embodiments of the overhead mounting system described herein.

FIG. 3 depicts a bottom-isometric view of a u-shaped channel for use in embodiments of the overhead mounting system described herein. The channel 300 includes a channel base 301, a plurality of channel base openings 301a, a plurality of channel bridge openings 301b, two channel walls 302, a plurality of channel wall openings 302a, and two channel ends 303. Each channel base opening is spaced from its neighboring channel base openings by a channel base inter-opening length 301c. Each channel wall opening is spaced from its neighboring channel wall openings by a channel wall inter-opening length 302b. Two channel wall openings are spaced from the channel ends by half the channel wall inter-opening length 302c.

Figure 4A:
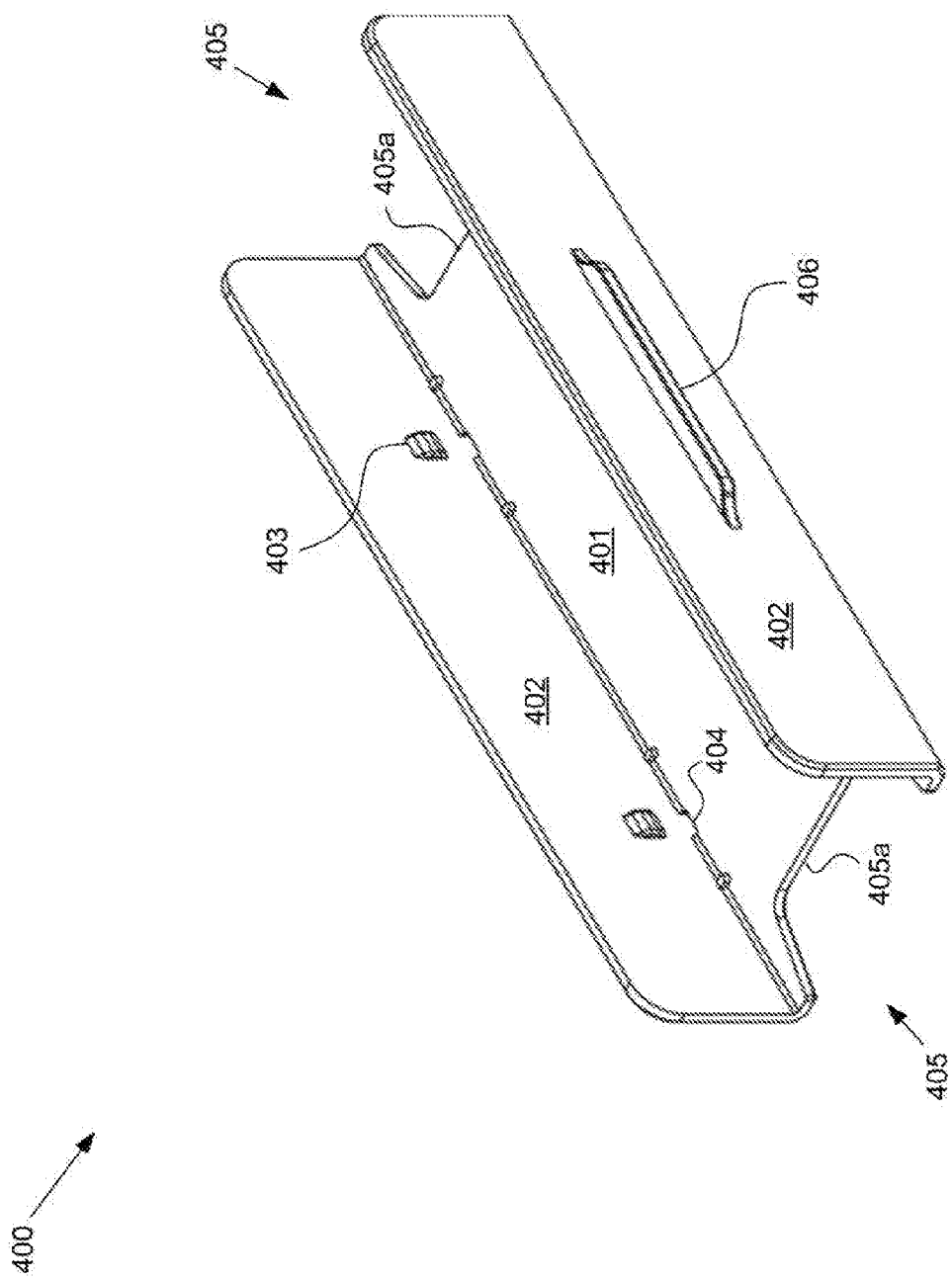
FIGS. 4A-C depict two perspectives of a u-shaped cover for use in embodiments of the overhead mounting system described herein.
Figure 4B:
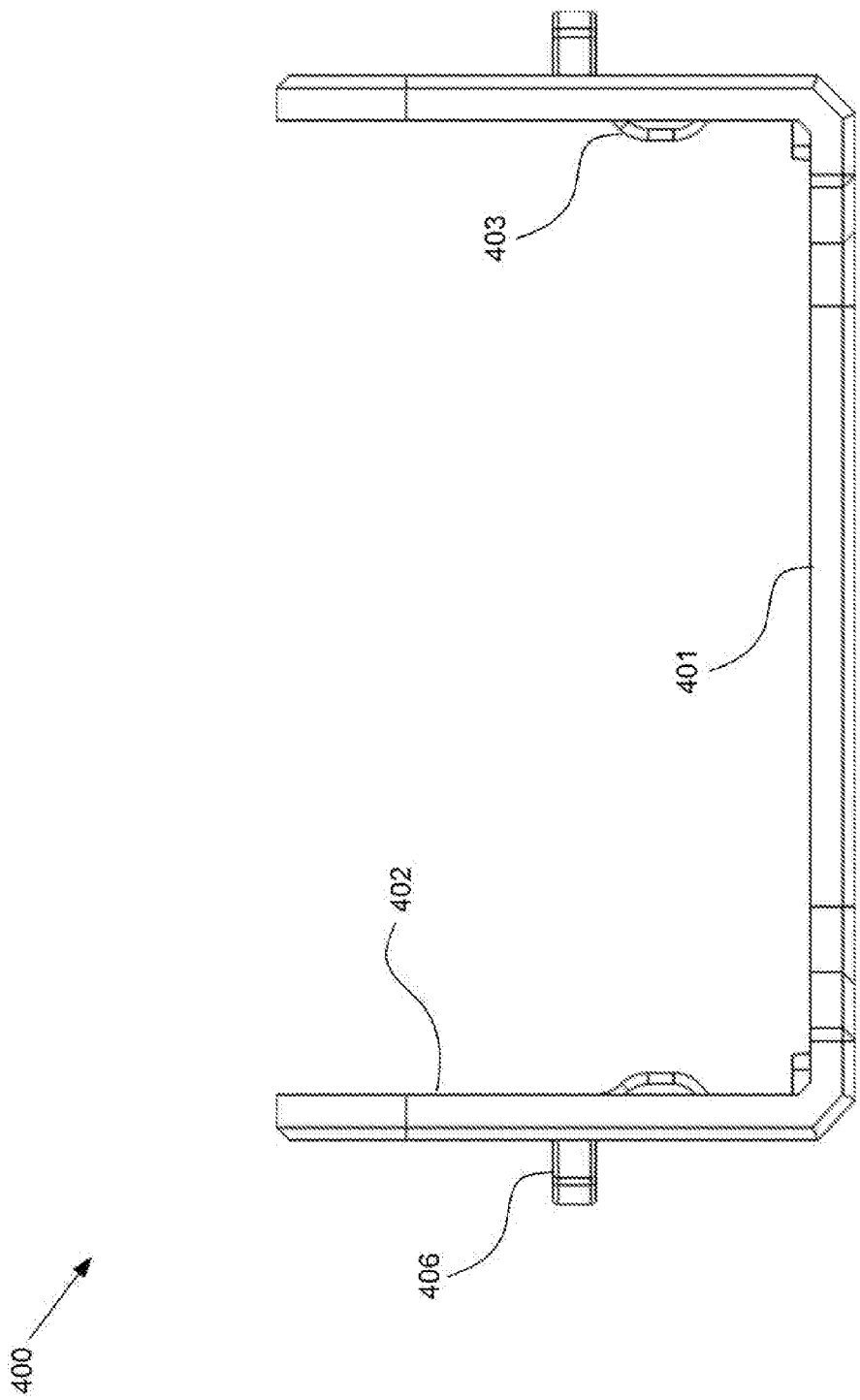
Figure 4C:
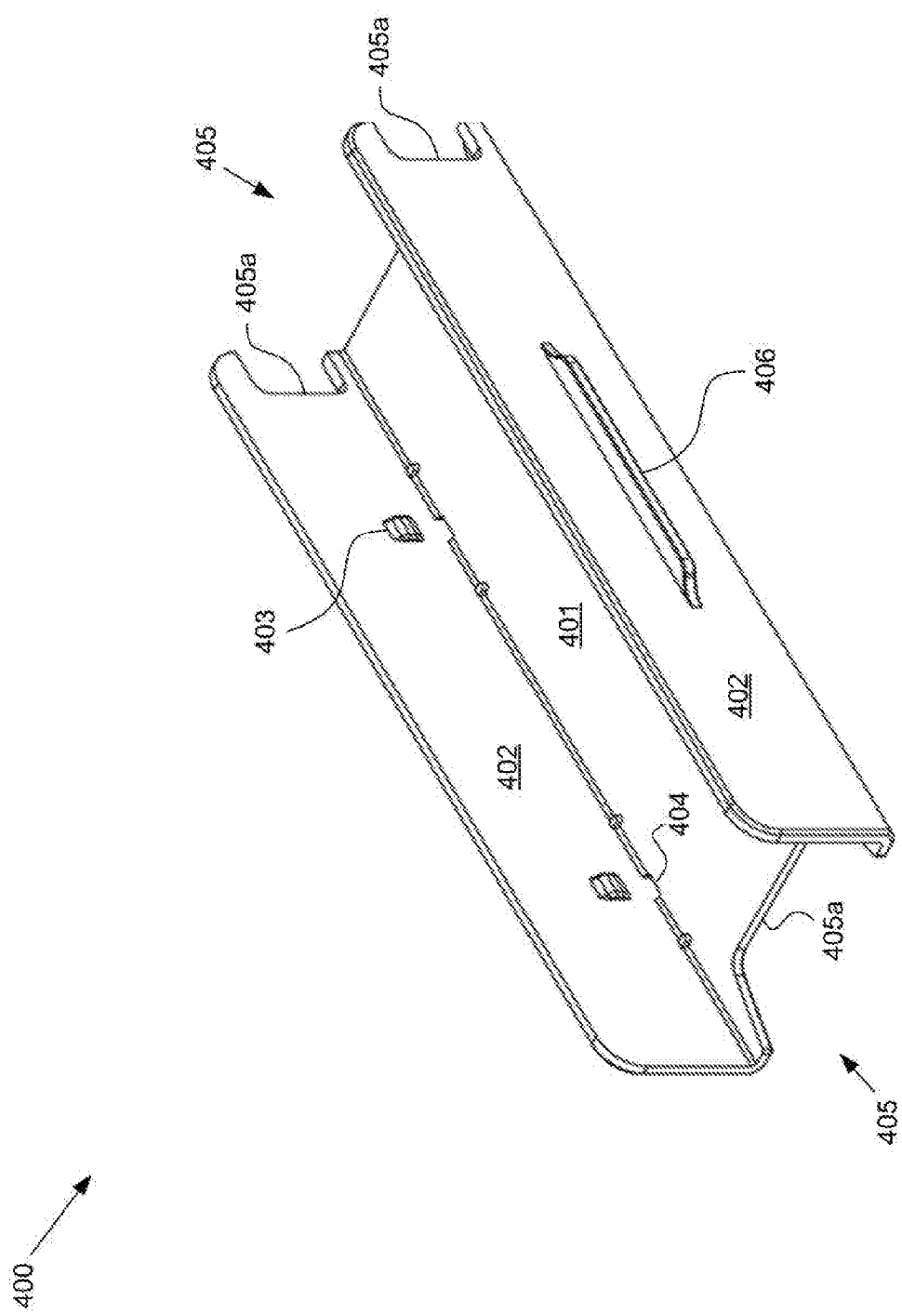

FIGS. 4A-C depict two perspectives of a u-shaped cover for use in embodiments of the overhead mounting system described herein. FIG. 4A is a top isometric view. FIG. 4B is an end view. FIG. 4C is an isometric view with an alternative concavity design. The cover 400 includes a cover base 401, two cover walls 402, inward protrusions 403, injection molding openings 404, two cover ends 405 with concavities 405a, and flanges 406. In FIG. 4A, the concavities are disposed in the cover base. In FIG. 4C, one concavity is disposed in the cover base at one end, and two concavities are disposed in the cover walls at the opposite end.

Figure 5:
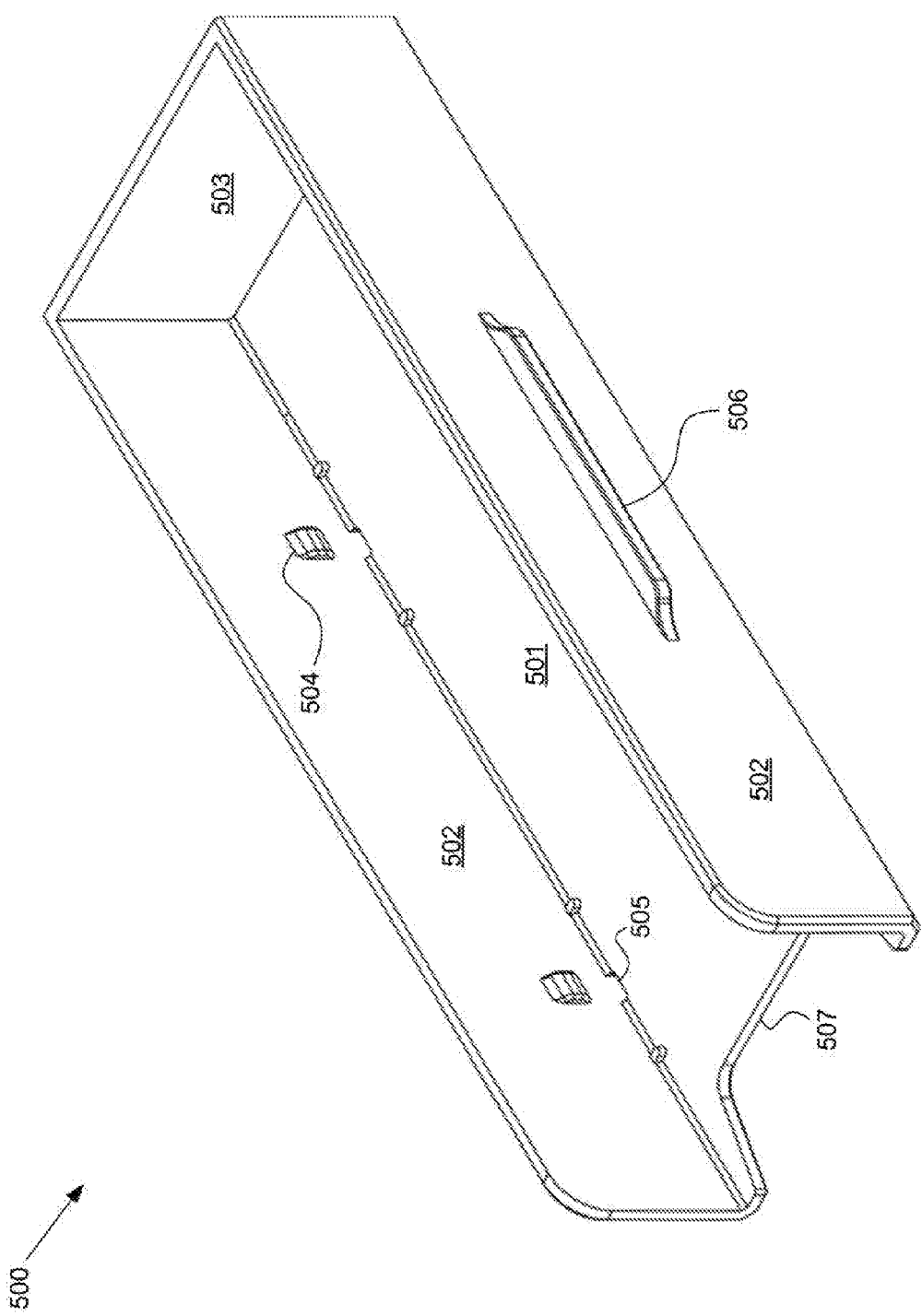
FIG. 5 depicts an isometric view of a u-shaped end cover.

FIG. 5 depicts an isometric view of a u-shaped end cover. The end cover 500 includes an end cover base 501, two parallel end cover walls 502, one perpendicular end cover wall 503, inward protrusions 504, injection molding openings 505, flanges 506, and an end concavity 507.

Figures 6A, 6B:
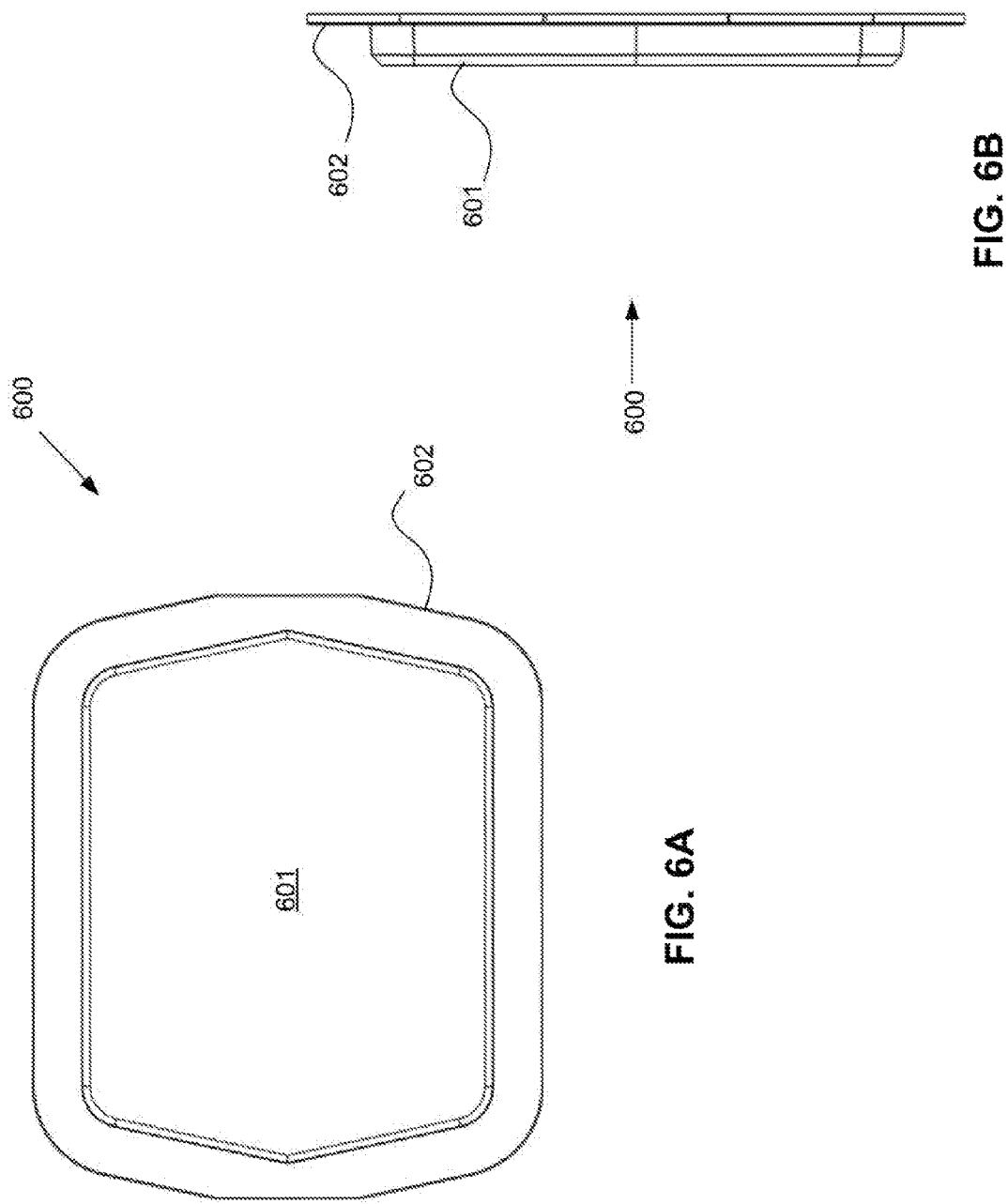
FIGS. 6A-B depict two perspectives of a cover spacer for use in embodiments of the overhead mounting system described herein.

FIGS. 6A-B depict two perspectives of a cover spacer for use in embodiments of the overhead mounting system described herein. The cover spacer 600 includes a spacer base 601 and a spacer flange 602.

Figure 7:
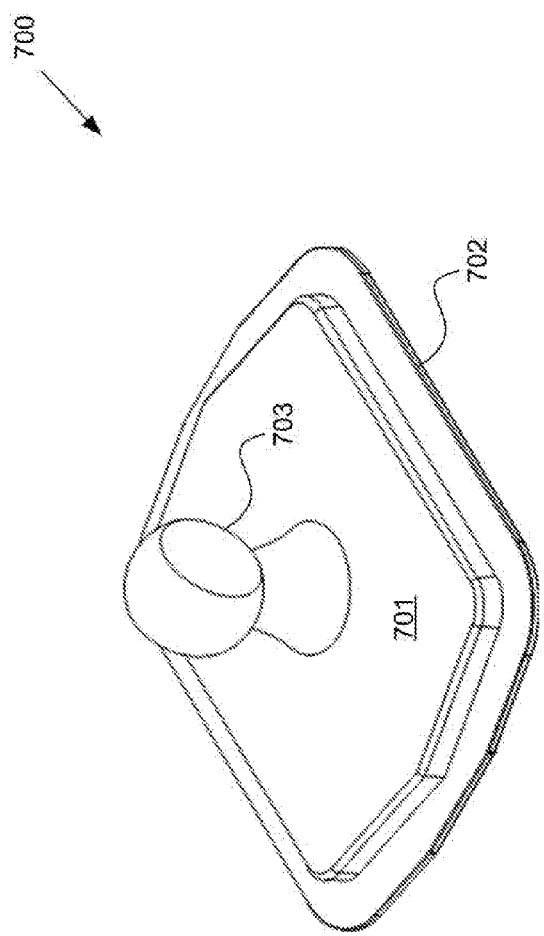
FIG. 7 depicts another embodiment of a cover spacer for use in embodiments of the overhead mounting system described herein.

FIG. 7 depicts another embodiment of a cover spacer for use in embodiments of the overhead mounting system described herein. The cover spacer 700 includes a spacer base 701, a spacer flange 702, and a spacer handle 703.

We claim:

1. An overhead mounting system, comprising:
    a u-shaped channel having a length ranging from 16 inches to 48 inches and a width ranging from half an inch to four inches, the channel comprising a channel base, at least two channel walls connected perpendicularly to the channel base, and at least two channel ends, wherein the channel base comprises a plurality of channel base openings, and wherein the channel walls each comprise a plurality of channel wall openings spaced from each other by a channel wall inter-opening length ranging from two inches to seven inches and at least one of the channel wall openings spaced from at least one of the channel ends by half the channel wall inter-opening length;
    a u-shaped cover comprising a cover base, at least two cover walls connected perpendicularly to the cover base, and at least two cover ends, wherein the cover walls each comprise one or more inward protrusions, at least one of the one or more inward protrusions spaced from at least one of the cover ends by half the channel wall opening length, and wherein the cover ends are concaved along the cover base, along one or more of the cover walls, or both; and
    a cover spacer comprising a flange and a spacer base, wherein the spacer base comprises a shape complementary to the cover end concavity.

2. The overhead mounting system of claim 1, comprising two or more inward protrusions spaced from each other by the channel wall inter-opening length.

3. The overhead mounting system of claim 1, wherein the one or more inward protrusions comprise a bump having at least one sharp edge and at least one sloped edge, the sloped edge oriented closest to the cover base.

4. The overhead mounting system of claim 1, wherein the one or more inward protrusions comprise a bump having at least two sharp edges and at least two sloped edges, the sloped edges oriented perpendicular to the cover base.

5. The overhead mounting system of claim 1, further comprising one or more injection molding openings disposed in the cover base along an edge formed by the cover base and at least one of the cover walls, and aligned with at least one of the inward protrusions.

6. The overhead mounting system of claim 1, further comprising at least two u-shaped covers, the covers connected to the u-shaped channel and disposed directly adjacent each other, wherein the ends of the cover walls directly contact each other, and wherein a portion of the ends of the cover bases directly contact each other.

7. The overhead mounting system of claim 1, wherein the concavity comprises a depth equal to one quarter of the channel wall inter-opening length.

8. The overhead mounting system of claim 1, further comprising one or more grasping flanges extending from external surfaces of the cover walls.

9. The overhead mounting system of claim 1, wherein a length of the channel is 30 inches.

10. The overhead mounting system of claim 1, wherein a length of the cover is one fifth times a length of the channel.

11. The overhead mounting system of claim 10, wherein four full covers and half each of two additional covers are mounted to the channel, the two halves mounted at the channel ends.

12. The overhead mounting system of claim 1, wherein the channel base openings comprise a diameter ranging from half an inch to one and a half inches, and wherein the channel wall openings comprise a diameter ranging from one-eighth of an inch to half an inch, wherein the channel base opening diameter is larger than the channel wall opening diameter.

13. The overhead mounting system of claim 1, wherein the channel base openings are spaced from each other by a channel base inter-opening length ranging from half an inch to three inches, the channel base inter-opening length shorter than the channel wall inter-opening length, wherein the channel comprises three channel base openings for every two channel wall openings.

14. The overhead mounting system of claim 1, wherein the channel is mounted to a ceiling by two lag bolts screwed into two truss beams.

15. The overhead mounting system of claim 1, wherein the cover is connected to the channel such that the cover base is disposed opposite the channel base and the inward protrusions are each disposed in corresponding channel wall openings.

16. The overhead mounting system of claim 1, the system comprising at least two covers connected to the channel adjacent to each other, each cover connected to the channel such that the cover base is disposed opposite the channel base and the inward protrusions are each disposed in corresponding channel wall openings, and wherein the spacer is disposed in the concavities between the adjacent covers such that the flange touches inside surfaces of the cover bases and such that the spacer base is disposed between the cover bases.

17. The overhead mounting system of claim 1, further comprising a u-shaped end cover comprising an end cover base, and at least three end cover walls connected perpendicularly to the cover base, wherein at least two of the end cover walls are parallel to each other and at least one of the end cover walls is perpendicular to the at least two end cover walls, wherein the at least two end cover walls each comprise one or more inward protrusions, at least one of the one or more inward protrusions spaced from the perpendicular end cover wall by half the channel wall opening length.

18. The overhead mounting system of claim 1, wherein the spacer magnetically attaches to at least one of the cover ends.

19. The overhead mounting system of claim 1, wherein the spacer further includes a handle connected directly to, and extending away from, the spacer base.

20. The overhead mounting system of claim 1, wherein the concavity is disposed along the cover walls on at least one of the cover ends, and wherein the concavity is disposed along the cover base on an opposite cover end of the at least one cover end.

\* \* \* \* \*